June 12, 1928.    1,673,399
C. D. CUTTING
LUBRICATING DEVICE FOR UNIVERSAL JOINTS
Filed March 11, 1927
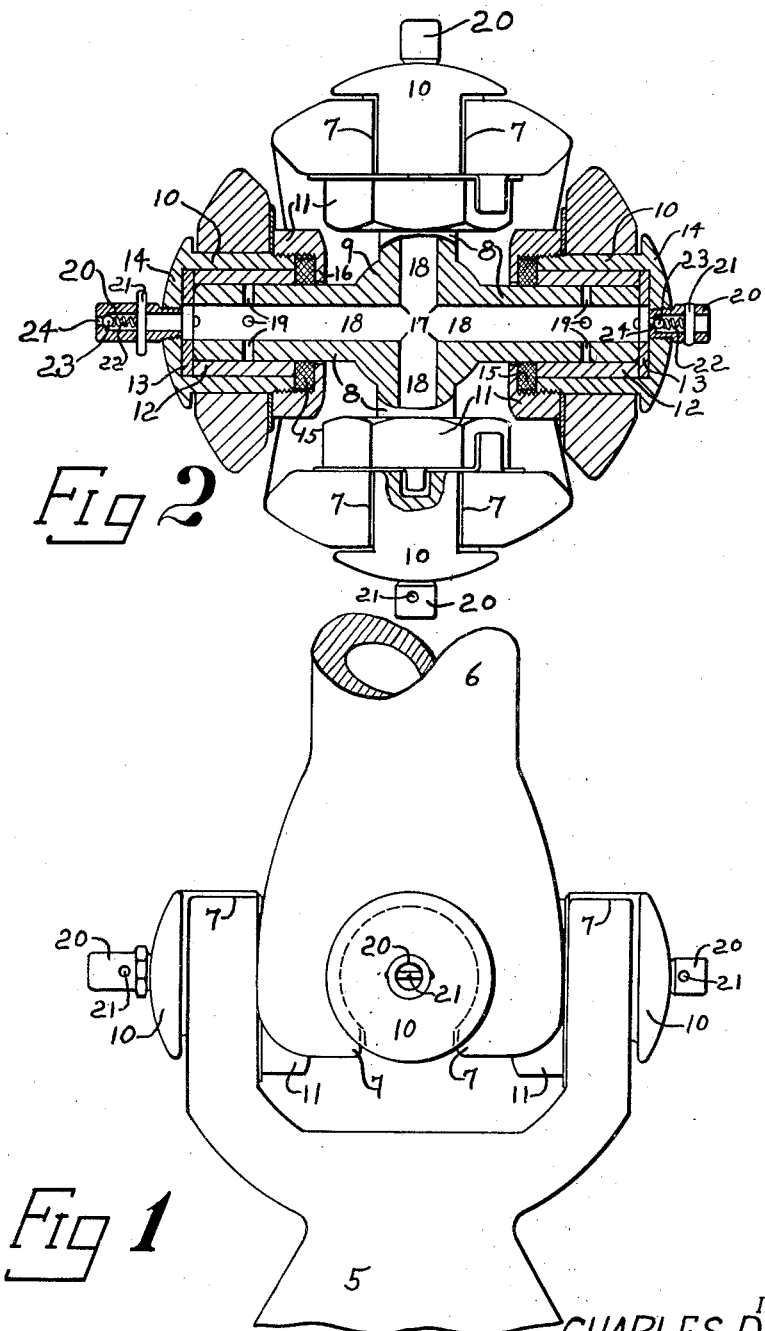
INVENTOR.
CHARLES. D. CUTTING
BY
Irving Harness
ATTORNEYS.

Patented June 12, 1928.

1,673,399

UNITED STATES PATENT OFFICE.

CHARLES D. CUTTING, OF DETROIT, MICHIGAN.

LUBRICATING DEVICE FOR UNIVERSAL JOINTS.

Application filed March 11, 1927. Serial No. 174,431.

It has been attempted at various times to produce universal joints which are provided with internal spaces for the reception of lubricant and which are sealed against the escape of lubricant so that the joint may operate for a long period of time without attention. Sooner or later, however, it becomes neccessary to replenish the lubricant and considerable difficulty is experienced because of the fact that the interior of the joint which is to receive it is filled with air for which there is no escape unless a secondary vent is provided.

One of the primary objects of my invention is to provide means for lubricating the entire joint from a single point coupled with means for automatically permitting the escape of air from the lubricant containing portion of the joint as lubricant is fed to the joint.

With the above and other objects in view, my invention consists in the arrangement, combination and construction of the various parts of my improved device as described in the specification, claimed in my claims and shown in the accompanying drawing, in which:

Fig. 1 is a plan view of a universal joint embodying my invention.

Fig. 2 is a sectional view of the same.

I have shown a universal joint comprised of a pair of yokes 5 and 6, the ends of which are provided with slots 7 thru which the arms 8 of a cardon cross may extend. The arms 8 are each integral with the central or body portion 9 of the cross. Each of the arms 8 is secured in one side of either the yoke 5 or the yoke 6 by means of a sleeve 10 and nut 11. A bushing 12 is provided within each of the sleeves 10 and a thrust washer 13 is provided between the end of each arm 8 and the closed end 14 of its sleeve 10. A flexible washer 15 is provided around each of the arms 8 and is squeezed against the end of its sleeve 10 and bushing 12 by the flange 16 on the nut 11 when the nut is screwed home.

The central or body portion 9 is provided with a lubricant container which may be said to comprise the central portion 17 and diverging passages 18 which lead to similar passages in the arms 8. Each of the passages 18 is provided with branch passages 19 which extend to the outer faces of the arms 8 within the bushings 12. Likewise each of the washers 13 is provided with a central aperture and fittings 20 are screwed into screwthreaded apertures in the ends 14 of the sleeves 10.

As will be clearly seen in Fig. 2 each of the fittings 20 is provided with a pin 21 extending therethru against which a coil spring 22 within the fitting bears. The other end of the coil spring 22 bears against a ball 23 which is seated in an opening 24.

Each of the fittings 20 is arranged in accordance with that shown on the right hand side of Fig. 2 with the exception of the fitting shown on the left hand side thereof. It will be apparent that a conventional grease gun may be applied to the fitting shown on the left hand side to force grease past the ball 23 therein into the passages 18 and central pocket 17. When these passages and the pocket have been filled it will be apparent that the lubricant will press against the balls 23 of each of the other fittings until a pressure sufficient to overcome the tension of the springs 22 therein has been built up when the lubricant will trickle past the balls 23 outside of the joint. As soon as this occurs the operator will know that the joint is filled with grease and will discontinue further introduction of the same.

It will be apparent that the balls 23 of the fitting shown on the right hand side of Fig. 2 as well as the two other fittings between it and the fitting on the left hand side of the figure will act as escape valves for air which may be contained in the joint when it is being filled with lubricant so that no difficulty will be had in introducing lubricant because of the existence of air in the passages.

Because each of the passages converge to the common center, a continuous passage permitting lubricant to flow equally to each of the bearings is provided.

It will be apparent that some of the fittings may be omitted if desired and that various other changes in the specific details and embodiment of my invention may be made without departing from the spirit thereof and it is my intention to cover by my claims such changes as may be reasonably included within the scope of my invention.

What I claim is:

1. In combination, a universal joint comprising yoke members and bearing members therein, means connecting said bearing members, a continuous passage between said bearing members, means for introducing lubricant to one bearing member and thru said passage to at least one other bearing, means normally sealing said bearing members and passage against lubricant escape and means for automatically breaking the seal by pressure from within the passage.

2. In combination, a universal joint comprising a pair of yokes and a cross member having its arms engaged in the yokes, a continuous passage thru the arms, means for introducing lubricant thru one of the arms and thru the passage to the other arms, means on the other arms normally sealing the passage to the atmosphere and adapted to be unsealed by pressure built up thru the introduction of lubricant.

3. In combination, a universal joint comprising a pair of yokes and a cross member having its arms extended within the yokes, a continuous passage thru the arms, means for introducing lubricant to the passage, a normally closed outlet for the passage and means automatically permitting opening of the outlet by pressure built up in the passage.

4. In combination, a universal joint comprising a pair of yokes and a cross member having its arms extended into and bearing within the yokes, a continuous passage joining the arms, means permitting passage of lubricant from the passage to the bearing surfaces of the arms, means for introducing lubricant thru one of the arms to the passage, and normally closed valve like devices in the ends of the other arms communicating with the passage adapted to be opened by pressure built up in the passage by the introduction of lubricant therein.

5. In combination, a universal joint comprising a pair of yokes, a cross member provided with arms extending into said yokes, cup shaped sleeves received in the arms of said yokes, bearings received in said cup shaped sleeves about the arms of said cross member, means for sealing the bearing surface between the arms of said cross and said bearings against leakage of lubricant, axial passages extending through the length of the arms of said cross member opening on the ends of the last mentioned arms and all joined together, valvular means for introducing grease through one of said cup-shaped sleeves into said passages, and spring pressed valvular means in the others of said cup shaped sleeves normally closed and operable under pressure within said passages to permit the flow of air or grease thereby to the exterior of said joint.

6. A universal joint having a plurality of bearings, a passage for conducting lubricant to the bearings, means for introducing lubricant at one point in the passage and means at another point in the passage adapted to be opened by pressure from within the passage, built up by said lubricant introduction, to unseal the same.

CHARLES D. CUTTING.